Feb. 24, 1959  A. DIELS ET AL  2,874,604
APPARATUS FOR MOLDING PLASTIC EXPLOSIVE MATERIALS
Filed March 22, 1956
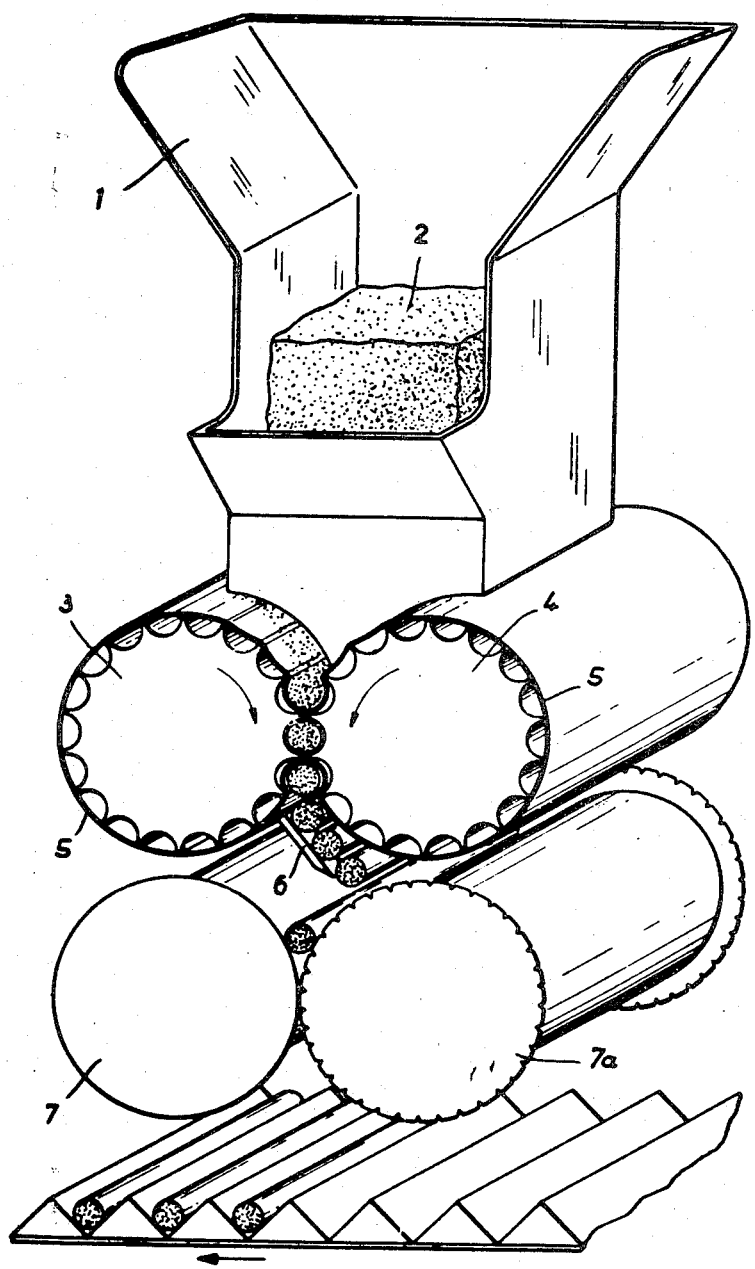
INVENTORS
ALBERT DIELS and HERMANN ORTH
BY
AGENT

United States Patent Office 2,874,604
Patented Feb. 24, 1959

2,874,604

APPARATUS FOR MOLDING PLASTIC EXPLOSIVE MATERIALS

Albert Diels, Brussels, Belgium, and Hermann Orth, Ludwigshafen-Oggersheim, Germany, assignors to Poudreries Réunies de Belgique S. A., Brussels, Belgium Application March 22, 1956, Serial No. 573,277

4 Claims. (Cl. 86—1)

The present invention relates to an apparatus for molding or shaping plastic explosives into elongated cylindrical rods. Many explosive materials, such as dynamite, are of a gel-like or thixotropic nature.

It is an object of the present invention to simplify the molding of explosives into rod-shaped objects, such as explosive cartridges, to increase the speed of production thereof, and to render such production more economical than previously was possible.

Another object of the invention is to mold a plastic explosive material into its final desired shape in a single continuous and automatic operation.

In the apparatus according to the invention the raw explosive material, such as dynamite and similar explosives, is passed between two grooved rollers having resilient sleeves mounted thereon under tension so as to mold or compress the material directly into its final desired shape.

Another important feature of the invention consists in mounting and rotating such grooved rollers so as not to be directly in engagement with each other, but to be spaced slightly from each other so that the individual rods, cartridges, or the like, which are molded by these rollers will be connected by a thin web and be subsequently severed from each other automatically and in a continuous operation prior to and in connection with the step of cutting off the ends of such rods or the like to obtain the final desired length thereof.

Further objects, features, and advantages of the present invention will appear from the following detailed description thereof which is to be read with reference to the accompanying diagrammatic drawing of one preferred apparatus according to the invention.

The single figure of the drawing shows a perspective side view of the apparatus.

Referring to the drawing, there is shown a hopper 1 which preferably has downwardly tapering side walls so as to assure proper feeding of the loose material 2 in a downward direction toward a pair of grooved rollers 3 and 4 which are driven by suitable means (not shown) so as to rotate in opposite directions, as shown by the arrows. In molding explosives friction should be avoided as much as possible. Therefore, hopper 1 is preferably mounted so that its lower edges are slightly spaced from rollers 3 and 4, for example, 3 to 5 mm. Also, hopper 1 is preferably mounted so as to be exchangeable. If used for making cartridges, its length should correspond with that of the cartridges, and the lower edges of the front and rear walls thereof should have a curvature so as to correspond with the curvature of rollers 3 and 4, with the central portion reaching substantially between the rollers so that the loose material will be confined by these walls and prevented as much as possible from spilling over.

Rollers 3 and 4, usually made of aluminum or a suitable synthetic material, are provided with a series of peripheral grooves which, if cartridges are to be molded, extend along the length of the rollers and are of semicircular shape of a radius corresponding to that of the desired cartridge, as shown in the drawing.

When rotating rollers 3 and 4 as shown by the arrows, the loose material will drop continuously into the grooves and be compressed from both sides to form round rods of a definite diameter. In order to prevent the material from sticking to rollers 3 and 4, each of them is provided with a rubber sleeve 5 which rests upon the peripheral edges of the adjacent grooves. During the operation, the pressure of the material will press sleeves 5 into the grooves and against the semicircular walls thereof. For this purpose, sleeves 5 preferably have a diameter so that the pressure of the material thereon will stretch the sleeves and increase the tension thereof. Consequently, as soon as the corresponding grooves of both rollers begin to draw apart after molding the rods or the like, the tension of sleeves 5 will tend to eject the molded rods from the grooves.

In order to avoid excessive pressure and friction upon the explosive material during the molding operation, and to assure a uniform consistency of the molded rods or the like throughout their length, rollers 3 and 4 are preferably made of greater length than the desired length of the completed rods, and they are mounted so as not to engage directly with each other. The peripheral edges of the corresponding grooves of both rollers will therefore not come together completely, but be slightly spaced from each other, for example, 1 mm. Any excessive accumulation of explosive material on the rubber sleeves 5 and within the grooves of rollers 3 and 4 will therefore be eliminated during the gradual compression by the rollers, simply due to the fact that the material will tend to escape toward the open ends of the grooves. The consistency of that portion of the molded rods which corresponds to the desired final length of the rods or cartridges will therefore be very uniform.

By mounting the two rollers 3 and 4 so as to avoid a direct engagement of the peripheral edges of the corresponding grooves, another very important advantage will be obtained. As clearly shown in the drawing, small connecting webs will thus be formed between the adjacent molded rods. The individual rods after being molded completely will therefore not be entirely cut off from each other and, after being released from the grooves in the rollers, they will not simply drop individually and haphazardly down to their next processing stage in which they are cut to their proper length by means of cutting blades 7 and 7a, but they will be guided to that point in an orderly sequence and in the proper position relative to such blades so as to extend exactly at a right angle thereto. Oblique or other uneven cuts will therefore be avoided, and the various movements of the apparatus including the subsequent conveying of the finished rods to their place of use may be accurately synchronized to assure a safe and continuous automatic operation of the entire apparatus.

However, the actual process of cutting off the end portions of the molded rods in which the material is of lower consistency and for making the rods of a length exactly as desired, requires that the rods be presented to the rotary cutting blades 7 and 7a individually. For this purpose, the connected row of rods, upon being ejected from the grooves in rollers 3 and 4 by means of the rubber sleeves 5 springing back to their original circular shape, slides downwardly along an inclined guide 6, the lower end of which is provided with a sharp cutting edge which extends parallel with the rollers on which the blades 7 and 7a are mounted at each end and along a line which is spaced at a distance from the peripheral surface of these rollers which corresponds to about half of the diameter of the individual rods or cartridges. As soon as the outer ends of the lowest rod which is still connected by the small web to the adjacent rods above it come into contact with the rotating blades 7 and 7a, this rod will be gripped by the blades and spun around about a longitudinal axis. Such movement will simultaneously bring the web between the two lowest cartridges into engagement with the cutting edge of guide 6 and thus sever the lowest cartridge from those above it. In order to increase the gripping action upon such cartridge, cutting blades 7a which will be the first to engage the cartridge ends are preferably provided with serrations, while the two blades 7 of the other roller may be smooth.

The two rollers connecting blades 7 and 7a, respectively, are cylindrical and of a length corresponding to that of the desired rods or cartridges. They are mounted with respect to each other so as to permit the rods to pass easily therethrough. The blades themselves are preferably of a thickness of about 3 to 5 mm. and are ground to a keen edge. This edge is preferably ground from both sides so that the rods after being cut will easily drop off the blades, and the excess cutoff portions will be deflected toward the outside.

In the event that the longitudinal seam on each rod or cartridge remaining from the connecting web after being cut by the edge of guide 6 should be removed entirely, the two cutting blades 7 and 7a may be rotated in the same direction but at different speeds, one rotating, for example, at 60 R. P. M. and the other at 20 R. P. M. If the two cylinders carrying the blades are properly spaced from each other at a distance corresponding to the final diameter of the rods, each rod will thus be rotated during the actual cutting operation and its peripheral surface will be rolled smoothly and accurately.

The individual finished rods or cartridges will then drop upon a conveyer belt which carries them to a packing machine or place of subsequent use, and which is preferably provided with prismatic grooves and moving in synchronism with the cutting operation so that each groove will be filled.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An apparatus for molding thixotropic materials comprising a pair of like horizontal rollers, each roller having a series of circumferential grooves extending parallel to each other and to the axis of each roller, said grooves being spaced from each other so as to form narrow peripheral wall portions separating adjacent grooves from each other, a resilient sleeve mounted on said peripheral wall portions under tension so as to be normally out of contact with said grooves, means for feeding said material from above upon said rollers, means for rotating said rollers in opposite directions so as to move successive ones of said narrow peripheral wall portions of the rollers into lateral registration, the laterally registering wall portions defining a thin gap therebetween at their closest approach whereby said material is gradually compressed between said rollers within the corresponding grooves thereof so as to form rod-shaped elements, said peripheral wall portions compressing the material in the thin gap to form small webs connecting the adjacent elements, means for cutting the two ends of each element simultaneously, and a stationary guide member between said rollers and said cutting means for guiding said connected molded elements toward said cutting means.

2. An apparatus for molding thixotropic materials comprising a pair of like horizontal rollers, each roller having a series of circumferential grooves extending parallel to each other and to the axis of each roller, said grooves being spaced from each other so as to form narrow peripheral wall portions separating adjacent grooves from each other, a resilient sleeve mounted on said peripheral wall portions under tension so as to be normally out of contact with said grooves, means for feeding said material from above upon said rollers, means for rotating said rollers in opposite directions so as to move successive ones of said narrow peripheral wall portions of the rollers into lateral registration, the laterally registering wall portions defining a thin gap therebetween at their closest approach whereby said material is gradually compressed between said rollers within the corresponding grooves thereof so as to form rod-shaped elements, said peripheral wall portions compressing the material in the thin gap to form small webs connecting the adjacent elements, means for cutting the two ends of each element simultaneously comprising a pair of parallel cylinders having cutting blades at each end, means for rotating said cylinders relative to each other, and a stationary guide member having a sharp cutting edge extending between said rollers and said cutting means and parallel with said rollers, and being inclined toward one of said cylinders so as to guide said elements one after the other into engagement with the blades on said cylinder, whereby said element will be turned about said stationary cutting edge and the web connecting said element with the adjacent element will be severed, said severed element then being cut at both ends by all of said blades simultaneously.

3. An apparatus for molding explosive cartridges comprising a pair of like horizontal rollers, each roller having a series of semicircular grooves in the outer walls thereof extending parallel to each other and to the axis of each roller, said grooves being spaced from each other so as to form narrow peripheral wall portions separating adjacent grooves from each other, a resilient sleeve mounted upon said wall portions under tension so as to be normally out of contact with said grooves, means for feeding explosive raw material from above upon said liners, means for rotating said rollers in synchronism in opposite directions so as to move successive ones of said narrow peripheral wall portions of the rollers into lateral registration, the laterally registering wall portions defining a thin gap therebetween at their closest approach whereby said material is gradually compressed and molded on said liners into the corresponding grooves of said rollers to form substantially round rod-shaped cartridges, said peripheral wall portions covered by said sleeves compressing the material thereon so as to form small webs connecting the adjacent cartridges, said sleeves tending to return to their normal tubular shape and ejecting said molded cartridges in a downward direction, means for cutting the two ends of each molded cartridge comprising a pair of parallel cylinders mounted so as to be spaced from each other at a distance substantially corresponding to the diameter of the molded cartridges, and each having a cutting blade at each end, means for rotating said cylinders with the blades thereon relative to each other at different speeds, the cutting blades on one of said cylinders having a serrated cutting edge, a stationary guide member having a sharp cutting edge extending between said rollers and said cutting means and parallel with said rollers, and being inclined toward said serrated blades so as to guide said cartridges one after the other into engagement with said serrated blades, whereby said cartridge will be turned by said blades about said stationary cutting edge so that the web connecting said cartridge with the adjacent cartridge will be severed, said severed cartridge then passing between said rotating cylinders and being cut at both ends by all of said blades simultaneously, and at the same time being rolled between said cylinders whereby the seam remaining from the web previously cut will be smoothed out, a conveyor belt underneath said cutting means and having grooves therein of prismatic shape and each adapted to receive one cartridge dropping thereon from said cutting means, and means for moving said conveyer belt in synchronism with the movements of said rollers and cutting means.

4. An apparatus for molding a plastic explosive material into elongated rods, comprising a pair of like horizontal rollers, each roller having a series of circumferential grooves extending parallel to each other and to the axis of each roller, said grooves being spaced from each other so as to form narrow peripheral wall portions separating adjacent grooves from each other, resilient sleeves mounted on the peripheral wall portions of the rollers under tension so as to be normally out of contact with said grooves, means for feeding said explosive material from above said rollers, and means for rotating said rollers in opposite directions so as to move successive ones of said narrow peripheral wall portions of the rollers into lateral registration, the laterally registering wall portions defining a thin gap therebetween at their closest approach.

References Cited in the file of this patent
UNITED STATES PATENTS

| | | |
|---|---|---|
| 1,958,184 | Cross | May 8, 1934 |
| 2,190,936 | De Back | Feb. 20, 1940 |
| 2,213,902 | Daniels | Sept. 3, 1940 |
| 2,660,914 | Johnson et al. | Dec. 1, 1953 |
| 2,717,419 | Dickey | Sept. 13, 1955 |
| 2,761,588 | Shields | Sept. 4, 1956 |